UNITED STATES PATENT OFFICE.

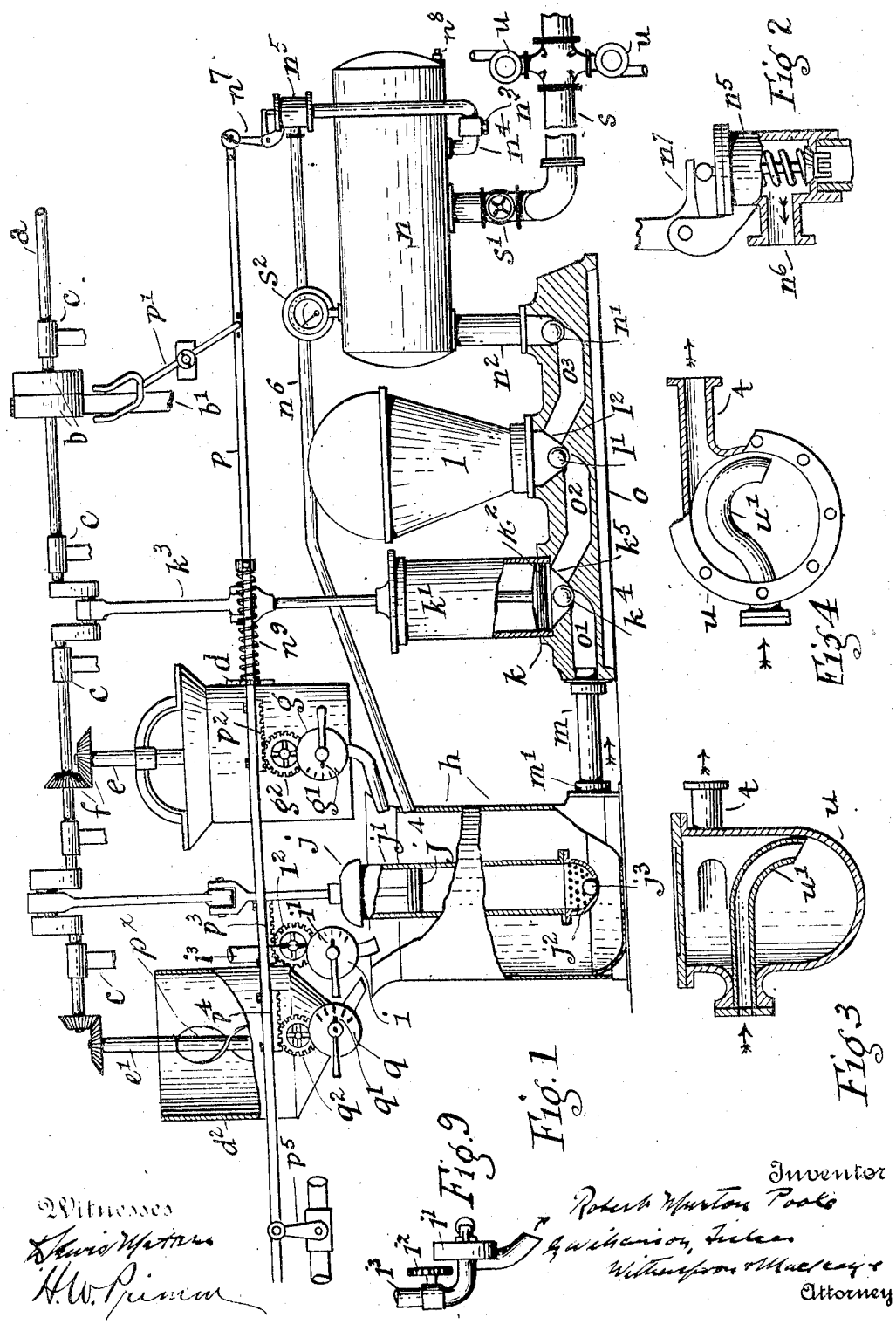

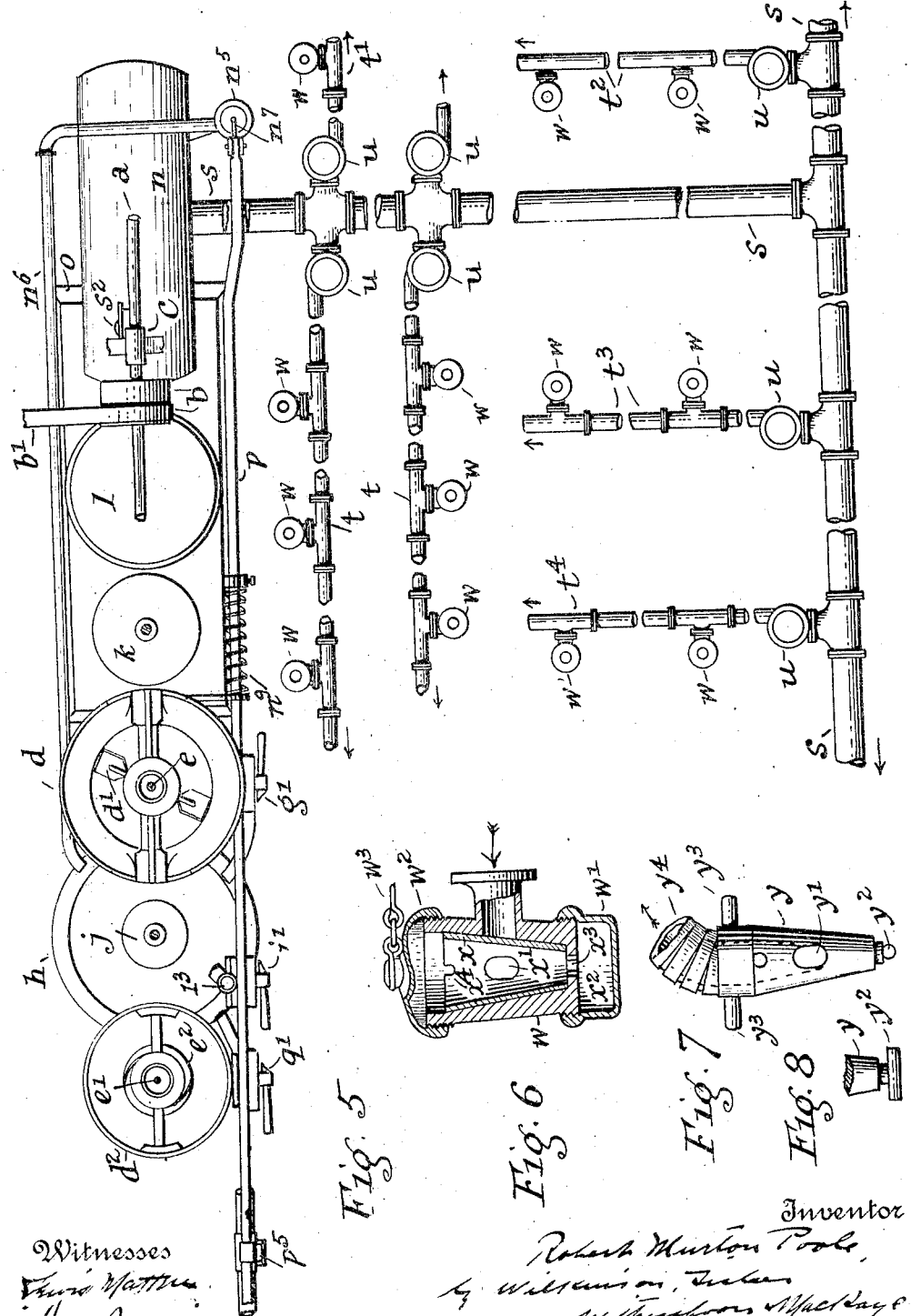

ROBERT MURTON POOLE, OF MOUNT GAMBIER, SOUTH AUSTRALIA, AUSTRALIA, ASSIGNOR OF ONE-THIRD TO FREDERICK HENRY DANIEL, OF MOUNT GAMBIER, SOUTH AUSTRALIA, AUSTRALIA.

MEANS FOR SUPPLYING A SPRAYING FLUID UNDER PRESSURE.

1,050,752.  Specification of Letters Patent.  Patented Jan. 14, 1913.

Application filed April 24, 1912. Serial No. 692,808.

*To all whom it may concern:*

Be it known that I, ROBERT MURTON POOLE, a subject of the King of Great Britain and Ireland, &c., residing at Mount Gambier, in the State of South Australia, Commonwealth of Australia, have invented certain new and useful Improved Means for Supplying a Spraying Fluid Under Pressure; and I do hereby declare the following to be a full, clear, and exact description of the invention, such as will enable others skilled in the art to which it appertains to make and use the same.

This invention provides improved means for supplying a spraying fluid under pressure for effectively spraying trees, crops, and the like.

The object of my invention is to provide an improved means for effectively mixing and supplying a spraying fluid under predetermined pressure, which will be automatic and certain in operation.

Referring to the accompanying drawings, Figure 1 is an elevation, partly in section illustrating one embodiment of my invention. Fig. 2 shows in elevation, partly sectional, a relief valve. Fig. 3 is a sectional elevation of a field centrifugal mixing and sediment chamber, and Fig. 4 a plan view of that chamber with its cover removed. Fig. 5 is a plan view, showing my invention as used with a system of feed pipes for the spraying mixture. Fig. 6 shows a sectional elevation of a valve or tap body having sediment discharge means of which a series are used in the field. Fig. 7 shows in elevation a plug for one or for in turn a series of tap bodies to be used to conduct the spray mixture to a hose, flexible tube, or the like, partly shown. Fig. 8 is a detail of the plug seen at right angles to the view in Fig. 7. Fig. 9 is an end view of a valve device.

In the drawings $a$ represents a line of shafting having bearings $c$, and adapted to be driven in any well known way, as by a shiftable belt $b^1$ adapted to engage fast and loose pulleys $b$ on said shafting. A tank $d$ is supplied in any suitable way with strong spraying liquid, and to keep it mixed there is at will any suitable agitator, as one having blades $d^1$ having any suitable angle, curve, or set, and mounted as on a spindle $e$ suitably driven from shaft $a$ as by bevel wheels $f$. The said compound is allowed to flow from vessel $d$ through an outlet regulated by a valve $g$ outside the casing of which is an indicator $q^1$, pointing to a scale, there being a handle or other means to set the valve to permit the rate of flow desired from tank $d$. The discharge is into a tank $h$, into which water or other liquid is admitted from a source not shown, as from a main, by way of pipe $i^3$, its flow being regulated by a valve $i$, the casing of which has a scale and an indicator $i^1$ of the kind already described. The said water or other liquid is to be thoroughly mixed with the compound to produce the desired spraying mixture and suitable means, shown as a pump $j$, is provided to effect the mixing. If desired, other substances, preferably in powdered form, can be supplied to the tank $h$ for use in combination with or independently of the compound in tank $d$. To supply tank $h$ with powder there is a vessel $d^2$ to be supplied in any suitable way and having any suitable outlet as a valve $q$ having also an indicator $q^1$ adjusted to control the rate of discharge through it. The powder in vessel $d^2$ is when required agitated to prevent it from consolidating and to insure its being fed out. Thus $e^1$ is a spindle to be rotated as from shafting and fitted with means as screw $p^x$ to feed powder to discharge through valve $q$. It is convenient to have at each feed valve described the said scale by which the respective regulator can be set from time to time.

When the spraying liquid or mixture of ingredients is ready for field use it is delivered through a pipe as $m$, which at its entrance $m^1$ has a strainer, by a pump $k$, the receiver $k^1$ of which it enters past a valve as $k^4$. The pump plunger $k^2$ is driven as from connection $k^3$ to shaft $a$. The liquid is further forced through an outlet $k^5$ past a valve $l^1$, into a pressure chamber $l$, thence by outlet $l^2$ past a valve $n^1$ into a distribution chamber $n$, as through pipe $n^2$. Liquid admitted into vessels $l$ and $n$ compresses any air not allowed to escape from the tops of these vessels, and one or more air pressure cushions will thus be formed. These aid in steadying the pressure in the field main $s$, which issues from vessel $n$. Pump cylinder $k^1$ and vessel $l$ are mounted suitably, as on base $o$, having passages $o^1$, $o^2$, $o^3$ with valves as $k^4$, $l^1$, and $n^1$.

$s^1$ is a valve controlling main $s$, and $s^2$ a pressure gage. Tank $n$ has a relief valve $n^5$ as on tube $n^4$ having a sediment or a liquid clearing plug $n^3$. Other clearing plugs, as at $n^8$, may be provided. When the pressure in the tank rises over the maximum decided on, (according to which the valve will be adjusted) then relief valve $n^5$ opens, and allows liquid to return through pipe $n^6$ to tank $h$. When it is not desired to supply the field, valve $s^1$ can be closed; then by continuing to pump and using clean water or a cleansing solution the passages and vessels described can be cleaned; plug $n^3$ can be removed and wash-water or liquid be allowed to escape thereby.

A rod $p$ having a belt shifter $p^1$ is connected to valve $n^5$ by an adjustable bell crank lever $n^7$; when the said valve opens, the belt $b^1$ on the fast pulley $b$ will be shifted to the adjacent loose pulley. Rod $p$ has connections so as to close or partly close valves on the pipes leading to vessel $h$. These valves may for example be shut off when valve $n^5$ is opened.

$g^2$, $i^2$ and $q^2$ are geared wheels, actuated by racks $p^2$ $p^3$ $p^4$ on rod $p$. As these wheels turn the valves close in part or if required altogether.

In Fig. 9 wheel $i^2$ operates a valve on pipe $i^3$ which leads to tank $h$; and like devices are usable with wheels $g^2$ and $q^2$.

The closing movement of rod $p$ controls the engine when required, as by link $p^5$ to partially close the throttle. When the pressure in vessel $n$ goes below the maximum aforesaid rod $p$ is returned to its normal position, and pumping and other operations are resumed. I use means as a spring $n^9$ to return rod $p$.

Pump $j$ has at the base of its cylinder $j^1$ a cage $j^2$, with holes to enable the matter acted upon to be ejected toward or spread over a large area of the tank interior.

$j^3$ indicates a valve, which opens at each up stroke of the pump plunger $j^4$ and admits material and closes on each down stroke, so returning the material with velocity through the holes, causing thorough mixing, and the breaking up of any solid matter that may be present.

There may be a plurality of mixing pumps.

Main $s$ is extended to reach different localities requiring spraying. It will have suitable bends and branches as $t$, $t^1$, $t^2$, $t^3$, $t^4$. There are field chambers $u$ in or near these mains, with curved feed inlet pipes $u^1$ by which liquid which enters is caused to swirl. The chamber interior has a rounded base. If sediment deposits after spraying has ceased, it may mostly be remixed by the swirl of the liquid that on the next occasion for spraying is passed through the chamber. The mixture discharged is conducted through any desired reticulation pipes which have means to enable the liquid to pass to spraying jets of any suitable kind by which to treat trees or plants.

$w$ are tap bodies connected to field pipes $t$, $t^1$, $t^2$, $t^3$, and $t^4$. Each tap body contains a rotatable sleeve $x$ having a hole $x^1$ and a notch $x^4$ (or notches), also a chamber $x^3$ to be formed by a cup or the like $w^1$ removable for cleaning purposes as by screwing. An upper cap $w^2$ closes the top of body $w$ when the latter is not in use and protects the sleeve $x$ from being moved out of its closed position. A hollow tapered plug $y$ is used with the tap body, and has a hole $y^1$ to correspond with sleeve hole $x^1$, and has lugs $y^2$ to fit into a hole $x^2$ in the base of chamber $w$. Lugs $y^2$ fit into notches $x^4$ in the sleeve $x$. By inserting plug $y$ and giving it a partial turn, sleeve $x$ will be turned, owing to pin $y^3$ being in notches $x^4$. This causes holes $x^1$ and $y^1$ to register with one another and allows liquid to be conveyed under the required pressure, into the hose or other spraying connections. Liquid which enters tap body $w$ passes through plug $y$ and a flexible connection $y^4$ to a nozzle which may be of any suitable form adapted for spraying, lugs $y^2$ taking a position preventing plug $y$ from being withdrawn from casing $w$ so long as holes $x^1$ and $y^1$ are open to the liquid supply. At intervals a solution adapted to scour or cleanse these field pipes or any other desired parts of the apparatus is pumped through. Clean water will be in many cases sufficient.

It will be obvious that some parts of this invention may be adhered to while varying or omitting others.

Having described this invention what is claimed by Letters Patent is:—

1. In an apparatus of the character described, the combination of a tank, means for supplying said tank with a liquid, a pressure reservoir, means for forcing the liquid from said tank to said reservoir, and means actuated by the pressure within said reservoir for regulating the supply of liquid to said tank.

2. In an apparatus of the character described, the combination of a tank, means for supplying said tank with a liquid, a pressure reservoir, means for forcing the liquid from said tank to said reservoir, and means actuated by the pressure within said reservoir for simultaneously regulating the supply of liquid to said tank and the action of said pump.

3. In an apparatus of the character described, the combination of a tank, mixing devices for supplying said tank with a spraying liquid, a pressure reservoir, a pump for forcing the liquid from said tank to said reservoir, a common power shaft for driving said mixing devices and pump, and means actuated by the pressure within said reservoir for controlling the action of said shaft.

In witness whereof I have hereunto set my hand in the presence of two witnesses.

ROBERT MURTON POOLE.

Witnesses:
FREDERICK HENRY DANIEL,
OSCAR WILLIAM KESSAL.